United States Patent [19]

Gelbart

[11] Patent Number: 5,049,901
[45] Date of Patent: Sep. 17, 1991

[54] LIGHT MODULATOR USING LARGE AREA LIGHT SOURCES

[75] Inventor: Daniel Gelbart, Burnaby, Canada

[73] Assignee: CREO Products Inc., Burnaby, Canada

[21] Appl. No.: 546,902

[22] Filed: Jul. 2, 1990

[51] Int. Cl.$^5$ .......................... G01D 9/42; H04N 1/21
[52] U.S. Cl. ..................................... 346/108; 346/160
[58] Field of Search ................. 346/108, 107 R, 76 L, 346/160; 358/296, 300, 302

[56] References Cited

U.S. PATENT DOCUMENTS

| | | | |
|---|---|---|---|
| 4,560,994 | 12/1985 | Sprague | 346/108 |
| 4,571,603 | 2/1986 | Hornbeek et al. | 346/160 |
| 4,888,724 | 12/1989 | Marom et al. | 364/807 |

Primary Examiner—Mark J. Reinhart

[57] ABSTRACT

A light modulator capable of using large area light sources consists of a light source such as an arc lamp imaged on a two dimensional light valve, preferably of the deformable mirror type. The light valve is imaged onto a light sensitive material and this image is scanned along the light sensitive material. The information to be imaged on the light sensitive material is entered into the first row of the light valve and as the image of the light valve is scanned along the material, the information in the first row is transferred to subsequent rows at a direction and rate keeping the imaged data stationary relative to the exposed material. By using a large number of rows, high light collection efficiency, high resolution and high data rates can be achieved at the same time. This overcomes the low brightness limitations of large area light sources such as arc lamps and incandescent lamps.

9 Claims, 2 Drawing Sheets

5,049,901

LIGHT MODULATOR USING LARGE AREA LIGHT SOURCES

BACKGROUND OF THE INVENTION

The invention relates to exposure systems and more specifically to the use of multi-spot modulators, also known as light valves, in exposure systems. Currently used two dimensional light modulators have to be used without relative motion between the image of modulator and the exposed material. Any motion during imaging of a two dimensional array would blur the image in the direction of the motion. One solution is to use a linear array (such as in U.S. Pat. No. 4,571,603) however when imaging large area light sources such as incandescent or arc lamps onto a linear array there is a large loss of light. Another solution is to use high brightness, small area light sources such as lasers however this is expensive when large amounts of light are required at short wavelengths (blue and ultra-violet). This invention is of particular importance to processes requiring large amounts of modulated light in the blue and ultra-violet such as exposure of printing plates, exposure of printed circuit boards and stereolithography.

SUMMARY OF THE INVENTION

According to this invention a light modulator capable of using large area light sources consists of a light source such as an arc lamp imaged on a two dimensional light valve, preferably of the deformable mirror type. The light valve is imaged onto a light sensitive material and this image is scanned along the light sensitive material. The information to be imaged on the light sensitive material is entered into the first row of the light valve and as the image of the light valve is scanned along the material, the information in the first row is transferred to subsequent rows at a direction and rate keeping the imaged data stationary relative to the exposed material. By using a large number of rows high light collection efficiency, high resolution and high data rates can be achieved at the same time. This overcomes the low brightness limitations of large area light sources such as arc lamps and incandescent lamps.

Another object of this invention is to provide a light modulator capable of modulating large amounts of light. Since the best sources for large amount of light have a large area, for example linear arc lamps, it is not possible to use prior art modulators without stopping the relative motion between the modulator, also referred to as light valve, and the exposed material. This invention enables the modulation of very large amount of light while scanning.

A further object of this invention is to provide a modulator for large area light sources compatible with most scanning methods. Commonly used scanning methods such as rotating or vibrating mirrors or a rotating drum are only compatible with linear multi-spot modulators. Using the present invention they can be used with two dimensional modulators.

BRIEF DESCRIPTION OF THE DRAWINGS

These and other objects of my invention will become apparent in the following description taken in connection with the drawings, in which.

DESCRIPTION OF THE PREFERRED EMBODIMENT

Figure 1:
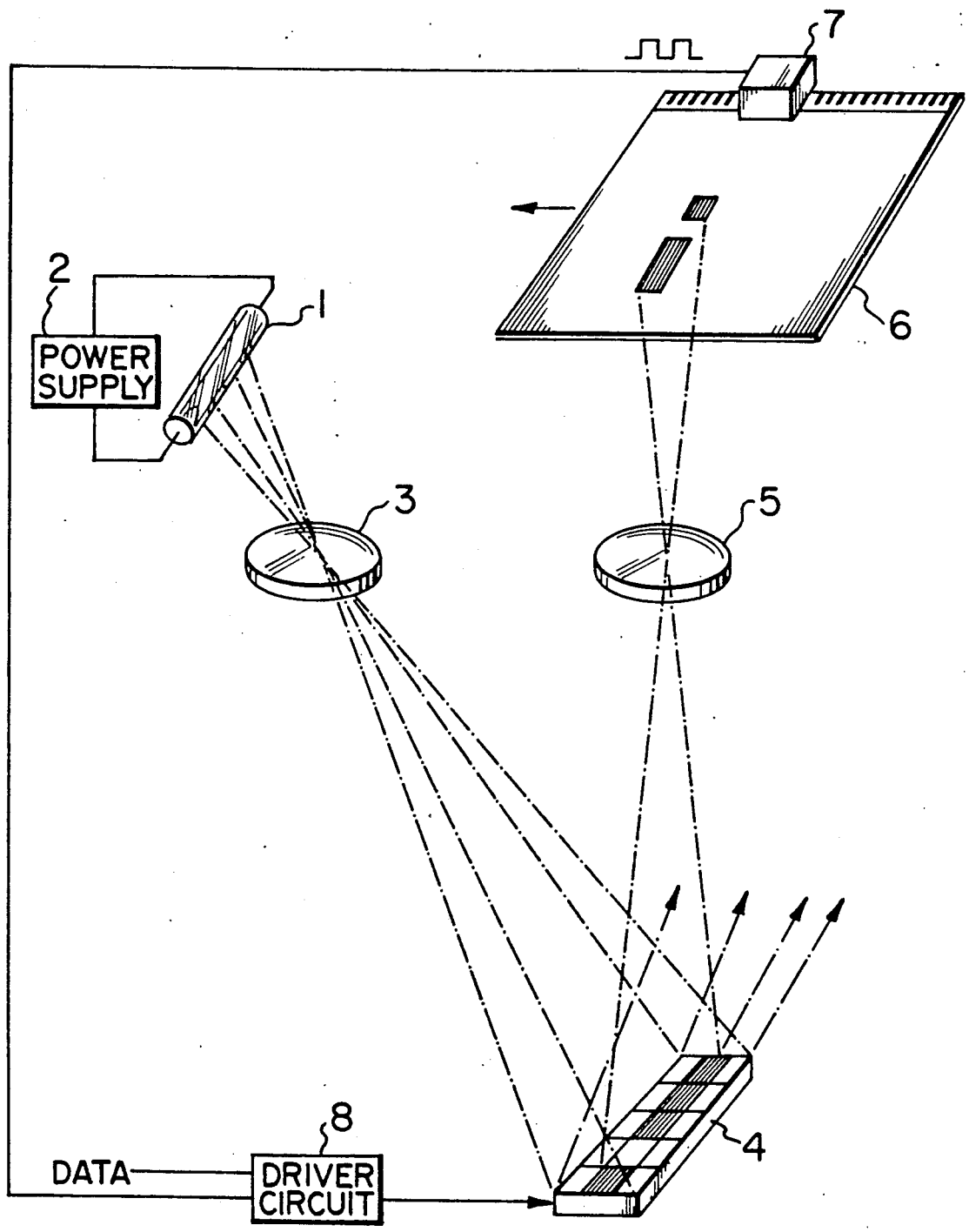
FIG. 1 is a schematic illustration of a preferred embodiment of the invention using a deformable mirror two dimensional modulator.

Referring to FIG. 1 a linear arc lamp 1 is powered by power supply 2 and imaged on a deformable mirror array 4 using lens 3. The deformable mirror modulator 4 is a commercially available device manufactured by Texas Instruments Inc. (Texas) and its principle of operation is covered by U.S. Pat. No. 4,441,791. Mirror array 4 is imaged onto light sensitive material 6 using lens 5. The position of light sensitive material 6 is measured by a position transducer 7. Position transducer 7 is a commercially available unit such as a linear encoder. When none of the deformable mirrors in array 4 are activated all the light falling onto array 4 is reflected away from lens 5 and therefore does not reach light sensitive material 6. When any one of the mirrors is activated it reflects the light into the aperture of lens 5 and therefore is imaged onto light sensitive material 6. This type of optical system is well known and will not be further detailed. Array 4 consists of many rows of deformable mirrors and is positioned in a way that the rows are perpendicular to the direction of motion of material 6.

The data to be imaged onto material 6 is loaded into the first row of array 4 using the driver circuit 8. The driver circuit is conventional in nature and is normally a part of the deformable mirror array therefore will not be discussed here. A similar circuit is described in U.S. Pat. No. 4,571,603.

Figure 2A:
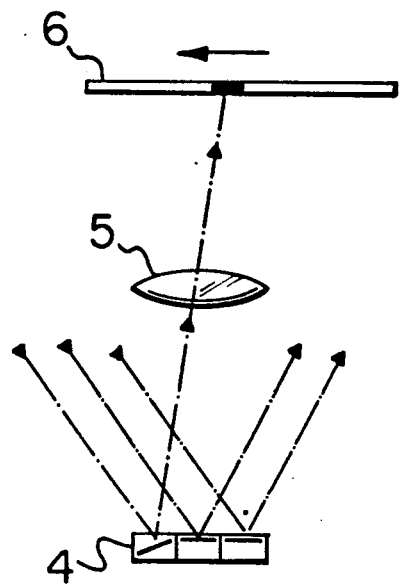
FIGS. 2a, 2b, and 2c are a schematic illustration of the principle of the invention using a deformable mirror modulator.
Figure 2B:
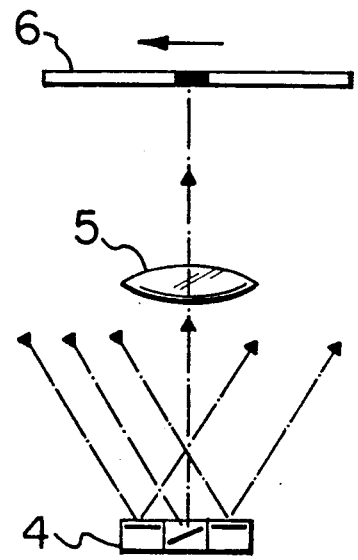
Figure 2C:
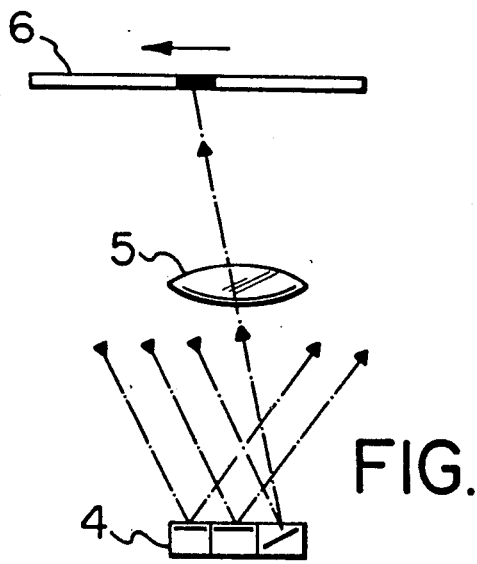

Referring now to FIG. 1 and FIG. 2, the essence of the invention is the synchronization between the motion of the light sensitive material 6 and the sequence of transferring the data from row to row inside array 4. The data enters the first row of array 4 and forms a pattern of activated mirrors. The same data pattern is transferred to the next row while a new pattern is loaded into the first row. From the second row the data is transferred to the third row without changing the pattern. This process is shown in FIG. 2, in which a, b and c show the sequence of data transfer between the rows of array 4. In the preferred embodiment the number of rows will be about 100 while the number of mirrors in each row will be about 1000. The exact number of rows and number of mirrors per row is dependent on the dimensions of the light source used and the data rate required.

When the speed of transfer of the data between rows is synchronized with the movement of light sensitive material 6 in a way that the image of a data pattern of any row appears stationary relative to the light sensitive material 6 no blurring of the image due to the motion of 6 will occur.

By the way of example, if lens 5 reduced the size of array 4 by a factor of two when imaging it on material 6 and the spacing of the deformable mirror elements is 0.01 mm, the transfer of data between rows should occur each time material 6 moved half of 0.01 mm. This is accomplished by using the pulses coming from position transducer 7 to control the data transfer from row to row in array 4.

It is clear to those versed in the art that moving the material 6 is only one of the many known ways of scanning the image of array 4 onto material 6. Other well known ways is using a moving mirror to scan the light along material 6 instead of moving the material. In this case position transducer 7 is attached to the moving mirror instead of to material 6. Another well known way is to wrap material 6 around a drum and rotate the drum in front of lens 5. In order to expose all of material 6 normally a two dimensional movement of the material or the light will be required. All these scanning methods do not form part of this invention and are well known to those versed in the art.

It is also clear that a deformable mirror array is not the only two dimensional light modulator which can be used in this invention. Other modulators useable are: a two dimensional liquid crystal array, two dimensional magnets-optic modulators, two dimensional ferro-electric modulators and any other modulator which can be fabricated into a two dimensional array.

I claim:

1. A light modulation and exposure system comprising: a light source; a light sensitive material; a two dimensional light modulator containing a plurality of rows of light modulating cells; means of imaging said light source onto said light modulator; means of imaging said light modulator onto said light sensitive material; means of generating relative motion between image of said light modulator and said light sensitive material with the direction of said motion substantially perpendicular to direction of said rows of light modulating cells; means of shifting into the first of said rows the data to be imaged onto said light sensitive material and means of transferring said data from the first row to subsequent rows of said modulator at a rate keeping the image of any data pattern substantially stationary relative to said light sensitive material until data shifted out of the last of said rows, this sequence continuing until all data to be imaged has passed through said light modulator.

2. A light modulation and exposure system as claimed in claim 1 wherein the two dimensional light modulator is an array of electrically controlled deformable mirrors and the imaging of the said light modulator is done in a manner that only those deformable mirrors activated by the data will result in light reaching said light sensitive material.

3. A light modulation and exposure system as claimed in claim 1 wherein the two dimensional light modulator is of the liquid crystal type.

4. A light modulation and exposure system as claimed in claim 1 wherein the two dimensional light modulator is of the magneto-optic type.

5. A light modulation and exposure system as claimed in claim 1 wherein the two dimensional light modulator is of the ferro-electric type.

6. A light modulation and exposure system as claimed in claim 1 wherein the two dimensional light modulator contains from 50 to 100 rows, each row containing from 100 to 5000 cells.

7. A light modulation and exposure system as claimed in claims 1 and 2 wherein the light source is a linear arc lamp.

8. A list modulation and exposure system as claimed in claim 1 where in the light source is a linear filament incandescent lamp.

9. A light modulation and exposure system as claimed in claim 1 wherein the light sensitive material is in liquid form.

* * * * *